(12) United States Patent
Chuo (10) Patent No.: US 8,989,803 B2
(45) Date of Patent: Mar. 24, 2015

(54) METHOD AND SYSTEM OF SYNCHRONIZATION IN DUAL-BEACON WIRELESS NETWORKS

(75) Inventor: Chun-Ting Chuo, Taipei (TW)

(73) Assignee: Koninklijke Philips N.V., Eindhoven (NL)

(*) Notice: Subject to any disclaimer, the term of this patent is extended or adjusted under 35 U.S.C. 154(b) by 679 days.

(21) Appl. No.: 12/595,398

(22) PCT Filed: Apr. 23, 2008

(86) PCT No.: PCT/IB2008/051563
§ 371 (c)(1),
(2), (4) Date: Oct. 9, 2009

(87) PCT Pub. No.: WO2008/129513
PCT Pub. Date: Oct. 30, 2008

(65) Prior Publication Data
US 2010/0142449 A1   Jun. 10, 2010

Related U.S. Application Data

(60) Provisional application No. 60/013,344, filed on Dec. 13, 2007, provisional application No. 60/913,609, filed on Apr. 24, 2007.

(51) Int. Cl.
*H04W 16/14* (2009.01)
*H04W 56/00* (2009.01)
*H04W 92/18* (2009.01)

(52) U.S. Cl.
CPC ............ *H04W 16/14* (2013.01); *H04W 56/002* (2013.01); *H04W 92/18* (2013.01)
USPC .................... 455/552.1; 370/503; 370/329

(58) Field of Classification Search
USPC ............... 370/328, 350, 503, 329, 507–514; 455/552.1, 502
See application file for complete search history.

(56) References Cited

U.S. PATENT DOCUMENTS

| | | | |
|---|---|---|---|
| 3,936,604 A * | 2/1976 | Pommerening | 375/356 |
| 7,120,456 B1 | 10/2006 | Elliot | |
| 7,649,870 B2 * | 1/2010 | Kado | 370/334 |
| 7,859,986 B2 * | 12/2010 | Laroia et al. | 370/208 |
| 8,233,505 B2 * | 7/2012 | Birru et al. | 370/503 |
| 8,432,854 B2 * | 4/2013 | Cordeiro et al. | 370/328 |
| 8,681,684 B2 * | 3/2014 | Dohler et al. | 370/315 |
| 2003/0152041 A1 * | 8/2003 | Herrmann et al. | 370/310 |
| 2005/0147071 A1 * | 7/2005 | Karaoguz et al. | 370/338 |
| 2006/0245440 A1 | 11/2006 | Mizukoshi | |
| 2007/0086401 A1 | 4/2007 | Hong | |
| 2010/0246537 A9 * | 9/2010 | Shao et al. | 370/336 |

* cited by examiner

*Primary Examiner* — Nay A Maung
*Assistant Examiner* — Angelica M Perez
(74) *Attorney, Agent, or Firm* — Larry Liberchuk (57) ABSTRACT

A wireless device (320) receives at least one beacon (325) of a first type ("Type-A beacon"), and synchronizes itself based on the timing of the Type-A beacon(s). Whenever the wireless device (320) synchronizes itself to the timing of a second wireless device (310) that is unable to receive Type-A beacons, then the wireless device (320) marks itself as a forced synchronization device and transmits Type-A beacons (325) that indicate that the first wireless device (320) is operating as a forced synchronization device. Whenever the wireless device (320) is marked as a forced synchronization device and receives a Type-A beacon (325) from a third alien wireless device (320) that is also marked as a forced synchronization device, but is synchronized to a fourth wireless devices (310) that is unable to receive Type-A beacons, then at least one of the first and third wireless devices (320) switches to a new channel.

13 Claims, 9 Drawing Sheets

METHOD AND SYSTEM OF SYNCHRONIZATION IN DUAL-BEACON WIRELESS NETWORKS

CROSS-REFERENCES TO RELATED APPLICATIONS

This patent application claims the priority benefit under 35 U.S.C. §119(e) of U.S. Provisional Patent Application 60/913,609, filed on 24 Apr. 2007, the entirety of which is hereby incorporated by reference as if fully set forth herein.

TECHNICAL FIELD

This invention pertains to wireless communication devices and methods, and more particularly, to a method and system of beacon synchronization for wireless devices.

BACKGROUND AND SUMMARY

In both centralized and distributed wireless networks, beacons are widely used to convey important control information between wireless devices. For example, when a "new" wireless device is just turned on, or just moved into an area where one or more other wireless devices (e.g., a wireless access point) are already operating, the beacon includes important information that allows the "new" wireless device to establish communications with the other existing wireless device(s). Such information may include timing information for synchronizing communications between the wireless devices, operating channels or frequencies, time slot assignments for data transmission, etc.

In the past, beacons typically have been broadcast so that any wireless device in the transmission range of the beaconing device can receive the beacon.

However, in next-generation wireless networks, wireless devices of different levels of complexity and cost are expected to share the same spectrum resources in a given vicinity. There are expected to be some "advanced" wireless devices (perhaps used in applications or apparatuses where cost is less of an issue) that have more advanced capabilities sharing spectrum with other "simple" wireless devices (perhaps used in applications or apparatuses where cost is more of an issue) that have reduced capabilities. In particular, the advanced wireless devices are expected to be able to communicate using a complicated but robust communication scheme, while the simple wireless devices communicate using a simpler, less robust communication scheme. One example of this situation is illustrated by Wireless USB devices which communicate in accordance with the WiMedia common radio platform.

However, when these advanced wireless devices try to communicate in a given frequency band in a given geographical region, and the simple wireless devices try to communicate in the same or an overlapping frequency band in the same or overlapping geographical region, potential problems exits.

Figure 1:
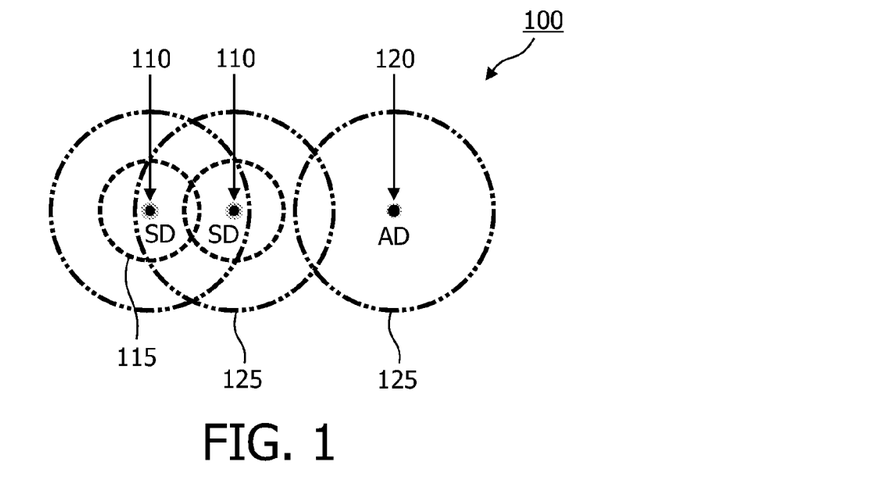
FIG. 1 illustrates an arrangement of two simple wireless devices and one advanced wireless device.

FIG. 1 illustrates an example arrangement 100 of wireless devices that illustrates this situation.

Arrangement 100 includes two simple wireless devices (SD) 110 operating in an overlapping frequency band in a same region as one advanced wireless device (AD) 120. In arrangement 100 illustrated in FIG. 1, advanced wireless device 120 transmits control frames or beacons 125 using a relatively complicated but more robust scheme. Meanwhile, simple wireless devices 110 transmit control frames or beacons 115 using a relatively simple but less robust scheme.

However, there is a co-existence problem between the simple wireless devices 110 and advanced wireless device 120. In particular, in arrangement 100, simple wireless devices 110 cannot receive or decode beacons 125 of advanced wireless device 120 due to the reduced capability of simple wireless devices 110. Therefore, simple wireless devices 110s may not be able to synchronize with advanced wireless device 120 so that their transmissions do not interfere with each other.

Accordingly, it would be desirable to provide a method of synchronizing wireless devices in a wireless network where one or more wireless devices operate with one type of beacon, and one or more other wireless devices operate with another type of beacon. It would further be desirable to provide wireless devices capable of performing such a synchronization method with devices using a different type of beacon.

In one aspect of the invention, a method of synchronization is provided for a system that is adapted to include at least two different types of wireless devices including Type-A wireless devices and Type-B wireless devices, wherein Type-B wireless devices are adapted to transmit Type-A beacons having a first format and Type-B beacons having a second format different from the first format and to receive only the Type-B beacons having the second format, and wherein Type-A wireless devices are adapted to transmit and receive only the Type-A beacons having the first format. The method comprises the following steps. When the first Type-A wireless device receives at least one Type-A beacon from one or more Type-B wireless devices, then the first Type-A wireless device is synchronized to the Type-B wireless device having the slowest clock, and transmits Type-A beacons that indicate that the first Type-A wireless device is operating as a forced synchronization device. When the first Type-A wireless device does not receive any Type-A beacons from any Type-B wireless devices, and receives a Type-A beacon from a second Type-A wireless device which Type-A beacon indicates that the second Type-A wireless device is operating as a forced synchronization device, then the first Type-A wireless device is synchronized to the second Type-A wireless device from now on and transmits Type-A beacons that indicate that the first Type-A wireless device is also operating as a forced synchronization device. When the first Type-A wireless device does not receive any Type-A beacons from any Type-B wireless devices, and receives a Type-A beacon from a second Type-A wireless device which Type-A beacon indicates that the second Type-A wireless device is not operating as a forced synchronization device, then the Type-A wireless device with a faster clock is synchronized to the Type-A wireless device with a slower clock and transmits Type-A beacons that indicate that the first Type-A wireless device is not operating as a forced synchronization device. When the first Type-A wireless device is operating as a forced synchronization device synchronized to a first Type-B wireless device, and the first Type-A wireless device receives a Type-A beacon from a second, alien Type-A wireless device which Type-A beacon indicates that the second Type-A wireless device is operating as a forced synchronization device that is synchronized to a second Type-B wireless device, then at least one of the Type-A wireless devices switches to another channel.

In another aspect of the invention, a method of synchronizing a first wireless device in a wireless network comprises: receiving at least one beacon of a first type; synchronizing the first wireless device based on a timing of the at least one beacon of the first type; and whenever the first wireless device synchronizes itself to a timing of a second wireless device that is unable to receive beacons of the first type, then marking the first wireless device as a forced synchronization device and transmitting beacons of the first type from the first wireless device that indicate that the first wireless device is operating as a forced synchronization device.

In still another aspect of the invention, a wireless device adapted to operate in a wireless network comprises: a transmitter; a receiver; and a clock. The receiver is adapted to receive at least one beacon of a first type and the clock is adapted to be synchronized based on timing of the at least one beacon of the first type. Whenever the clock is synchronized to a second wireless device in the wireless network that is unable to receive beacons of the first type, then the wireless device marks itself as a forced synchronization device, and the transmitter transmits beacons of the first type that indicate that the first wireless device is operating as a forced synchronization device.

DETAILED DESCRIPTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided as teaching examples of the invention.

Figure 2:
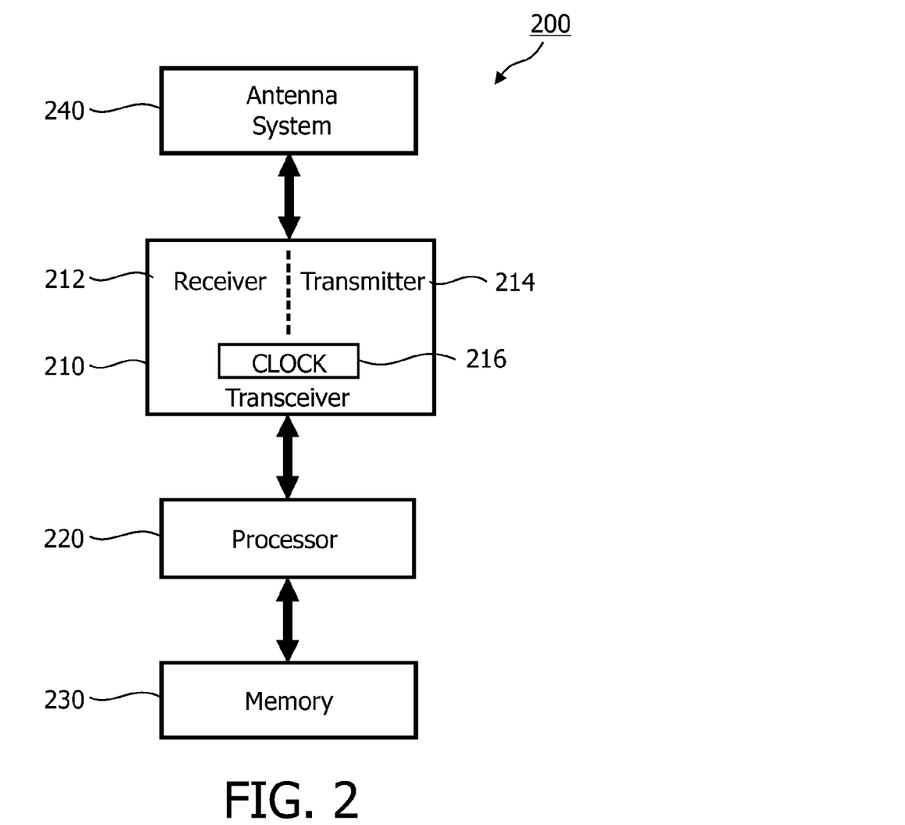
FIG. 2 is a functional block diagram of one embodiment of a wireless device.

FIG. 2 is a functional block diagram of a wireless device 200. As will be appreciated by those skilled in the art, one or more of the various "parts" shown in FIG. 2 may be physically implemented using a software-controlled microprocessor, hard-wired logic circuits, or a combination thereof. Also, while the parts are functionally segregated in FIG. 2 for explanation purposes, they may be combined variously in any physical implementation.

Wireless device 200 includes a transceiver 210, processor 220, memory 230, and an antenna system 240.

Transceiver 210 includes a receiver 212, a transmitter 214, and a clock 216. Clock 216 may provide one or more clock signals to receiver 212, transmitter 214, and/or processor 220 for controlling the timing of transmission and reception operations of wireless device 200. Transceiver 210 provides functionality for wireless device 200 to communicate with other wireless devices in a wireless communication network according to the standard protocols of the wireless communication network. For example, in one embodiment wireless device 200 is a wireless device adapted to operate using a communication protocol according to the WiMedia specifications.

Processor 220 is configured to execute one or more software algorithms in conjunction with memory 230 to provide the functionality of wireless device 200. Beneficially, processor 220 includes its own memory (e.g., nonvolatile memory) for storing executable software code that allows it to perform the various functions of wireless device 200. Alternatively, the executable code may be stored in designated memory locations within memory 230.

In FIG. 2, in one embodiment antenna system 240 may be a directional antenna system provides a capability for wireless device 200 to select from a plurality of antenna beams for communicating with other wireless devices in a plurality of directions. In one embodiment, directional antenna system 240 comprises a plurality of antennas each corresponding to one antenna beam. In another embodiment, directional antenna system 249 comprises a steerable antenna that can combine a plurality of different antenna elements to form a beam in a plurality of different directions.

Figure 3:
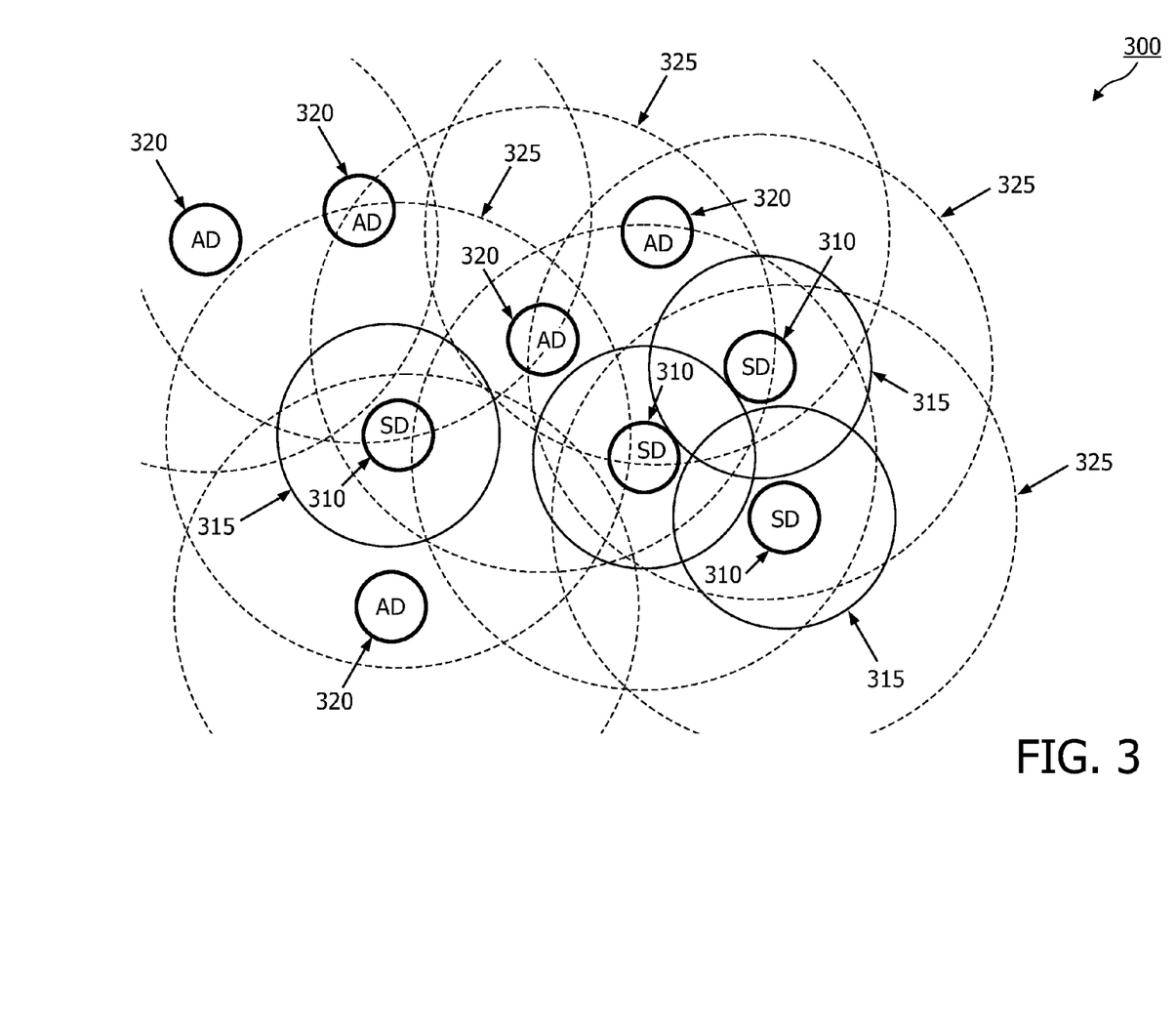
FIG. 3 illustrates one exemplary embodiment of a wireless system.

FIG. 3 illustrates one exemplary embodiment of a wireless system 300. Wireless network 300 includes simple wireless devices (SD) 310 operating in an overlapping frequency band in a same region as advanced wireless devices (AD) 320. Simple wireless devices 310 and/or advanced wireless device 320 may have the architecture of wireless device 200 of FIG. 2. Illustratively, advanced wireless devices 320 may include computers, mobile telephones, personal digital assistants (PDAs), or similar wireless devices that may operate in a wireless network. It is noted that only a few advanced and simple wireless devices 320 and 310 are shown in FIG. 3; this is merely for simplicity of discussion. Clearly, many other advanced and simple wireless devices 320 and 310 may exist. Moreover, it is noted that all advanced wireless devices 320 are not necessarily the same as each other, and all simple wireless devices 310 are not necessarily the same as each other. In fact, a plethora of different types of advanced and simple wireless devices 320 and 310 may be used within system 300.

In wireless system 300, advanced wireless devices 320 transmit control frames or beacons (hereinafter referred to as "AD beacons") 325 using a relatively complicated but more robust scheme. In a case where advanced wireless devices 320 employ the Ecma media access control (MAC) protocol, AD beacons 325 may be transmitted using the specified "common beacon mode for Type-A." Meanwhile, simple wireless devices 310 transmit control frames or beacons (hereinafter referred to as "SD beacons") 315 using a relatively simple but less robust scheme. Where simple wireless devices 310 employ the Ecma MAC protocol, beacons may be transmitted using the specified "common beacon mode for Type-B."

In wireless system 300, simple wireless devices 310 are capable of transmitting and receiving SD beacons 315. Furthermore, each simple wireless device 310 can transmit but not receive an AD beacon 325, due to the complexity of AD receiver, in addition to its SD beacon 315. As will be appreciated, this permits advanced wireless devices 320 to be made aware of the presence of simple wireless devices 310 and the communication resources which they are using.

In wireless system 300, in general simple wireless devices 310 transmit and/or receive over a first communication range;

and advanced wireless devices 320 transmit and/or receive over a second communication range which is greater than the first communication range. The noted ranges may be indicative of the complexity of the coding, interleaving, and/or modulation formats employed for the transmitted signals. In that case advanced wireless devices 320 require more complex signal processing capabilities—and typically cost more—than simple wireless devices 310. In general, the range of advanced devices is larger than the range of simple devices.

In one embodiment, advanced and simple wireless devices 320 and 310 communicate within a communication structure that includes a repeating communication pattern such as superframes.

Figure 4:
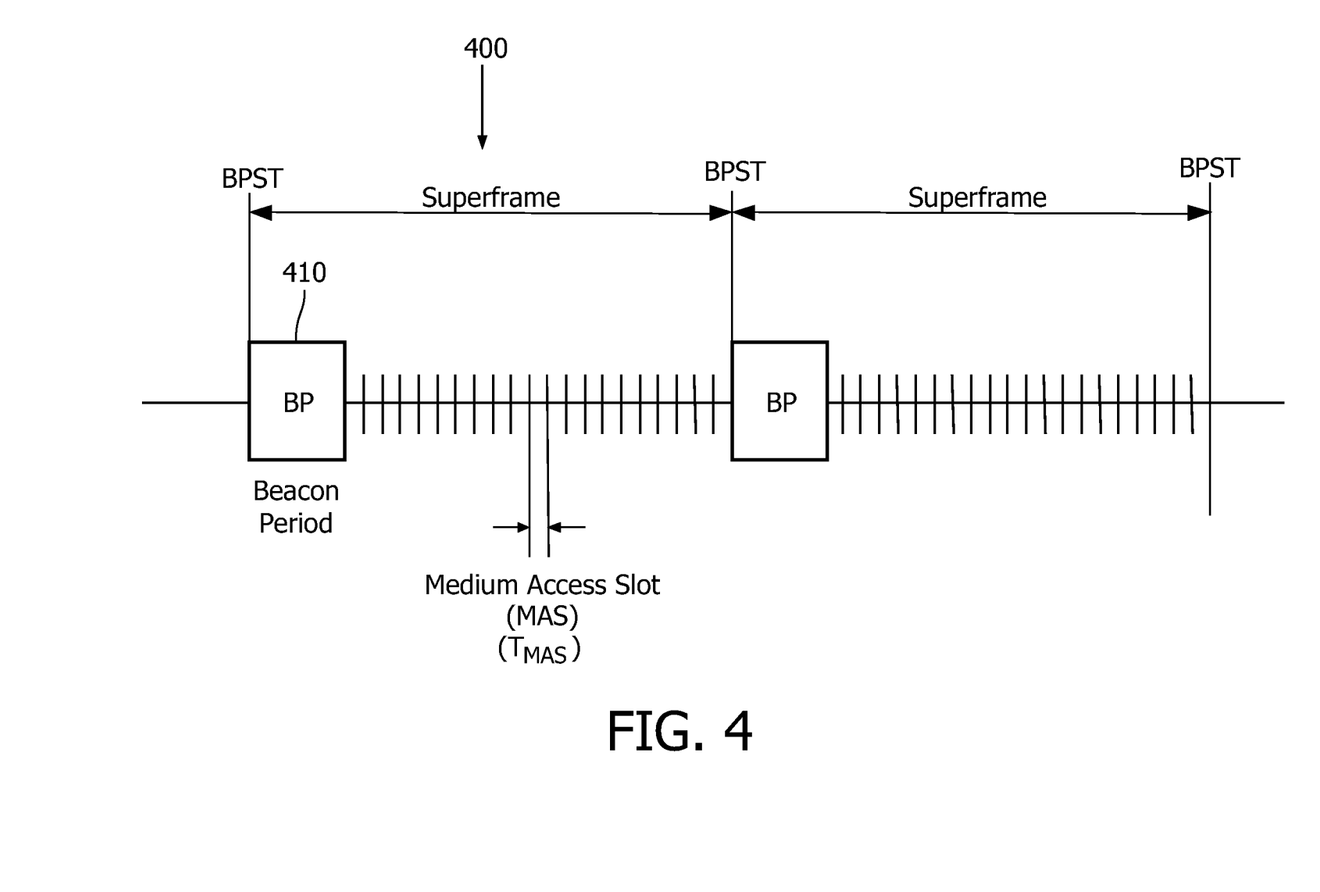
FIG. 4 illustrates one exemplary embodiment of a superframe.

FIG. 4 illustrates one exemplary embodiment of a superframe 400 by which advanced and simple wireless devices 320 and 310 may communicate. Superframe 400 includes a beacon period (BP) 410. It should be understood that superframe 400 is not drawn to scale and, in some embodiments, BP 410 comprises a very small portion of the entire superframe 400.

It should be appreciated that BP 410 provides a fully distributed and autonomous mechanism for coordination of advanced and simple wireless devices 320 and 310, and better spectrum use by advanced and simple wireless devices 320 and 310. Beneficially, in this way beacon coordination does not rely on a central coordinator.

Figure 5:
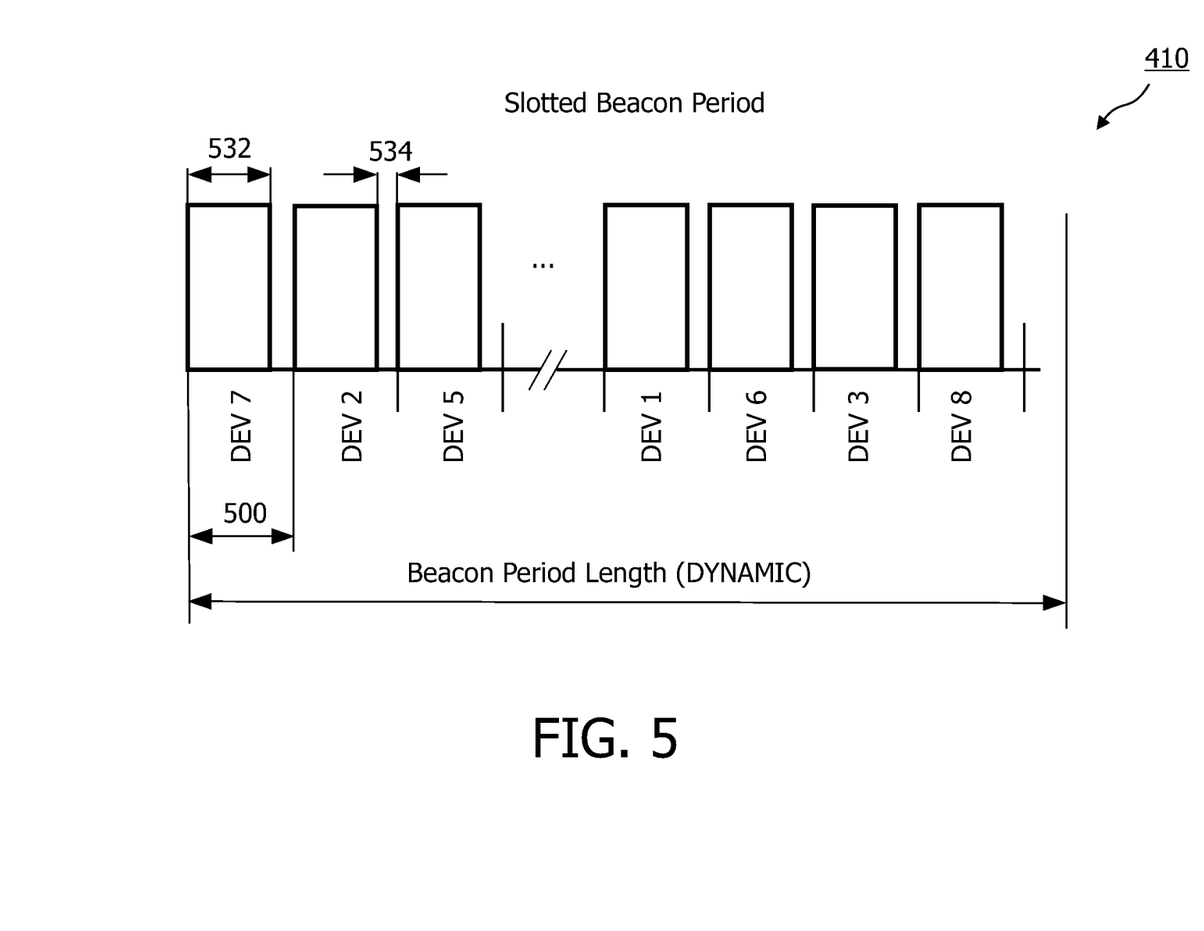
FIG. 5 illustrates one exemplary embodiment of a beacon period for transmission of beacons by beaconing device(s) within a close vicinity of each other.

FIG. 5 illustrates one exemplary embodiment of a BP 410 in a superframe 400 for transmission of beacons by advanced and simple wireless devices 320 and 310. BP 410 comprises a plurality of beacon slots 500, each of which may be occupied by an AD beacon 325 transmitted by an advanced wireless device 320 or a simple wireless device 310, or an SD beacon 315 transmitted by a simple wireless device 310. As described in greater detail below, in one embodiment, a beacon transmitted by an advanced or simple wireless device 320 or 310 within BP 510 may include beacon parameters and one or more information elements (IEs). In one embodiment, beacon parameters may include one or more of the following: a Device Address (DevAddr); a Beacon Slot Number; etc.

Figure 6:
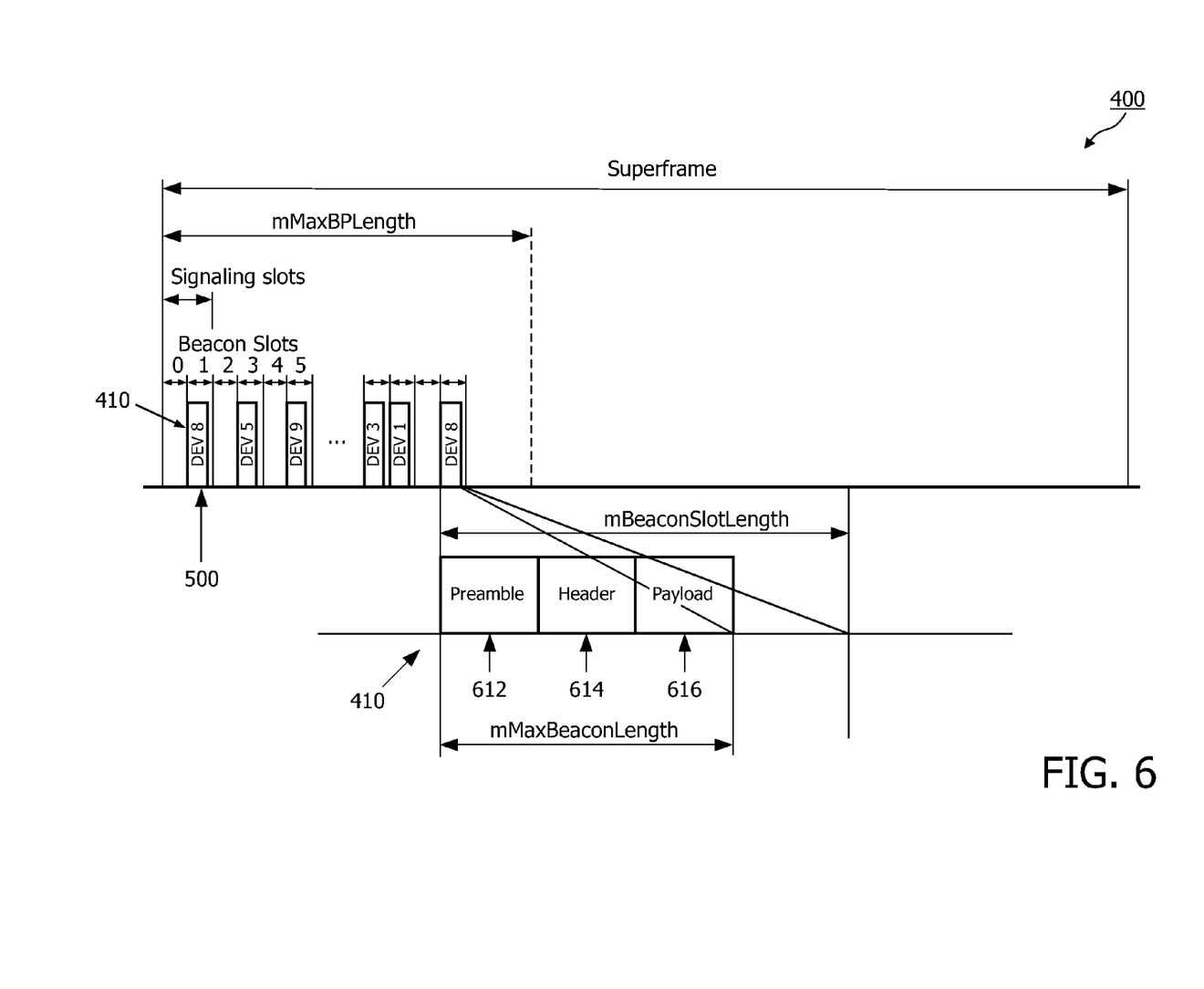
FIG. 6 illustrates a more detailed view of one exemplary embodiment of the superframe and beacon period of FIG. 4.

FIG. 6 illustrates a more detailed view of one exemplary embodiment of the superframe 400 of FIG. 4. As can be seen in FIG. 6, each BP 410 includes a plurality of beacon slots 500, some or all of which are occupied by beacons 610, each of which may be an AD beacon 325 or an SD beacon 315. In one embodiment, each beacon 610 includes a preamble 612, a header 614, and a beacon payload 616. As illustrated in FIG. 6, in one embodiment, the lengths of each BP 410 are variable up to a corresponding maximum beacon period length. Also, as shown in FIG. 5, each beacon slot 500 comprises a corresponding beacon length 532 and guard time 534.

Figure 7:
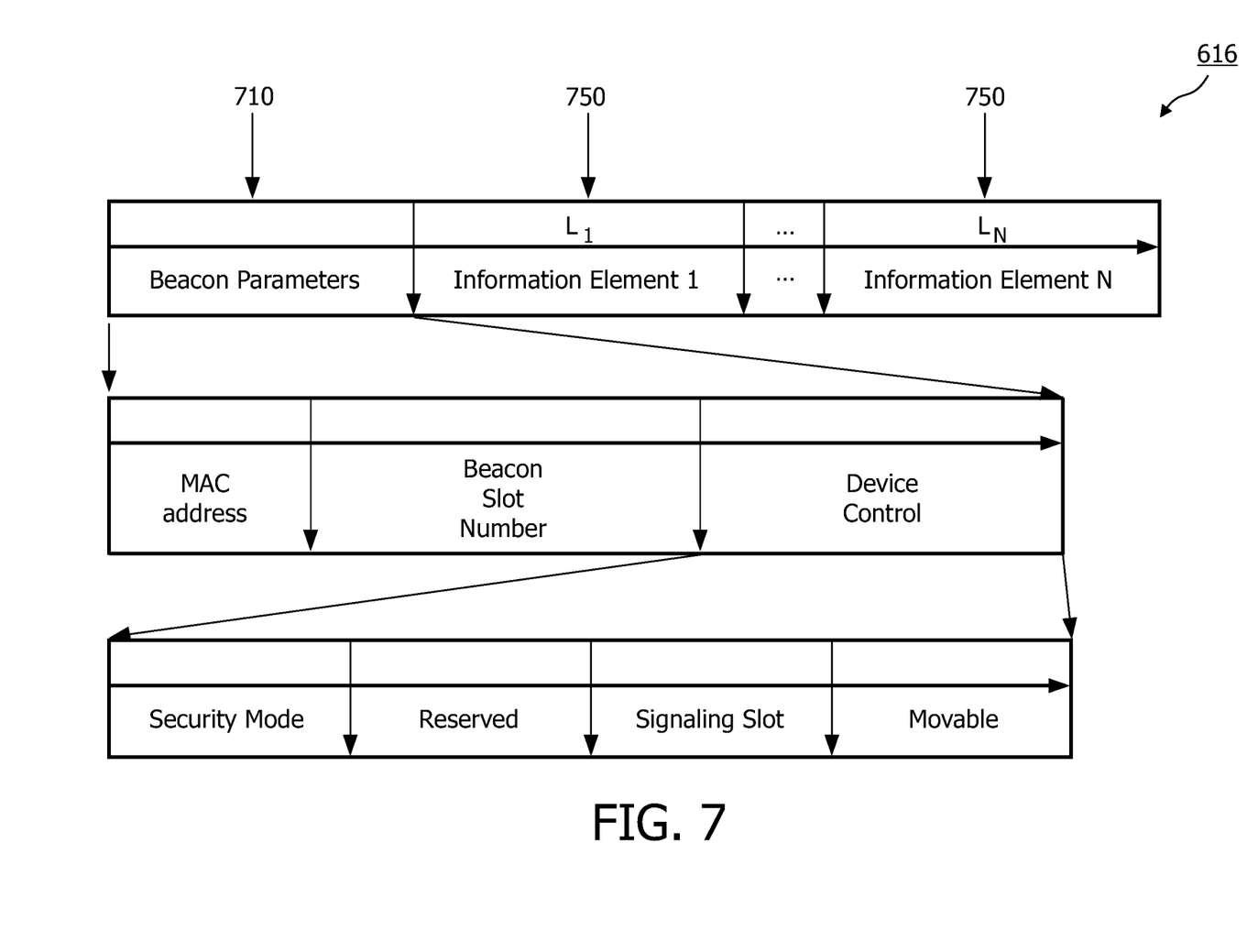
FIG. 7 illustrates one exemplary embodiment of a beacon frame payload.

FIG. 7 illustrates one exemplary embodiment of a beacon payload 616. Beacon payload 616 includes one or more beacon parameters 710 and one or more information elements 750.

Beneficially, beacon parameters 710 identify parameters of the beacon. Exemplary beacon parameters 710 may include a Device Identifier, a Beacon Slot Number, and Beaconing Device Control parameters, such as a Security Mode at which the device is operating, etc. Beneficially, beacon IEs 750 comprises data transmitted by an advanced or simple wireless device 320 or 310 that may include information about the transmitting device and/or wireless system 300.

Now, with the explanation of superframes and beacon periods as described above with respect to FIG. 4-7 in mind, we turn back to the system 300 of FIG. 3. It can now be understood that wireless devices in system 300 must maintain a level of synchronization of their clocks 216 so that their beacons do not interfere with each other. In particular, in FIG. 5 consider what would happen if the clock 216 of Device 6 were to run much faster than the clock 216 of Device 1. In that case, Device 6 might begin to transmit its beacon 500 at a time when Device 1 had not yet finished transmitting its beacon 500. So the beacons 500 would collide and interfere with each other.

Accordingly, a synchronization protocol is provided.

In a first case where wireless system 300 includes only simple wireless devices 310, then the simple wireless devices 310 use SD beacons 315 to synchronize their timing with each other. In particular, whenever a new simple wireless device 310 in the vicinity of system 300 desires to begin communication, before it starts to transmit it must first listen for any beacons 610 (e.g., SD beacons 315). From these beacons, the new simple wireless device 310 can determine which beacon slots 500 are occupied, and the timing employed by the corresponding simple wireless device 310 that transmitted that beacon. Then, the new simple wireless device 310 of wireless system 300 synchronizes its operations to the slowest simple wireless device 310 in the wireless system 300. Beneficially, all simple wireless devices 310 monitor the SD beacons 315 of all other simple wireless devices 310 in system 300 and synchronize their clocks 216 to the slowest clock 216 in the wireless system 300.

Similarly, in a case where wireless system 300 includes only advanced wireless devices 320, then the advanced wireless devices 320 use AD beacons 325 to synchronize their clocks 216 to the slowest clock 216 in the wireless system 300.

However, even with these protocols, there is still a problem when system 300 includes a mix of simple wireless devices 310 and advanced wireless devices 320.

Beneficially, to address this issue, a synchronization protocol for advanced wireless devices 320 operates as follows.

First, in a case that an advanced wireless device 320 receives one or more AD beacons 325 transmitted by one or more simple wireless devices 310, then the advanced wireless device 320 synchronizes to the slowest simple wireless device 310 via the AD beacons 325 transmitted by the slowest simple wireless device 310. In that case, advanced wireless device 320 sets one or more bits in its own AD beacon 325 (e.g., in a beacon IE 750) that marks itself as "forced synchronization device."

Next, any advanced wireless device 320 receiving no AD beacons 325 from simple wireless devices 310, but having one or more neighboring advanced wireless devices 320 that has marked itself as a "forced synchronization device" synchronizes with such neighbors and marks itself (e.g., in its beacon 325) as a "forced synchronization device."

Finally, any advanced wireless device 320 that receives an "alien beacon" from outside system 300 that is marked as a forced synchronization device switches the channel on which it operates.

Figure 8:
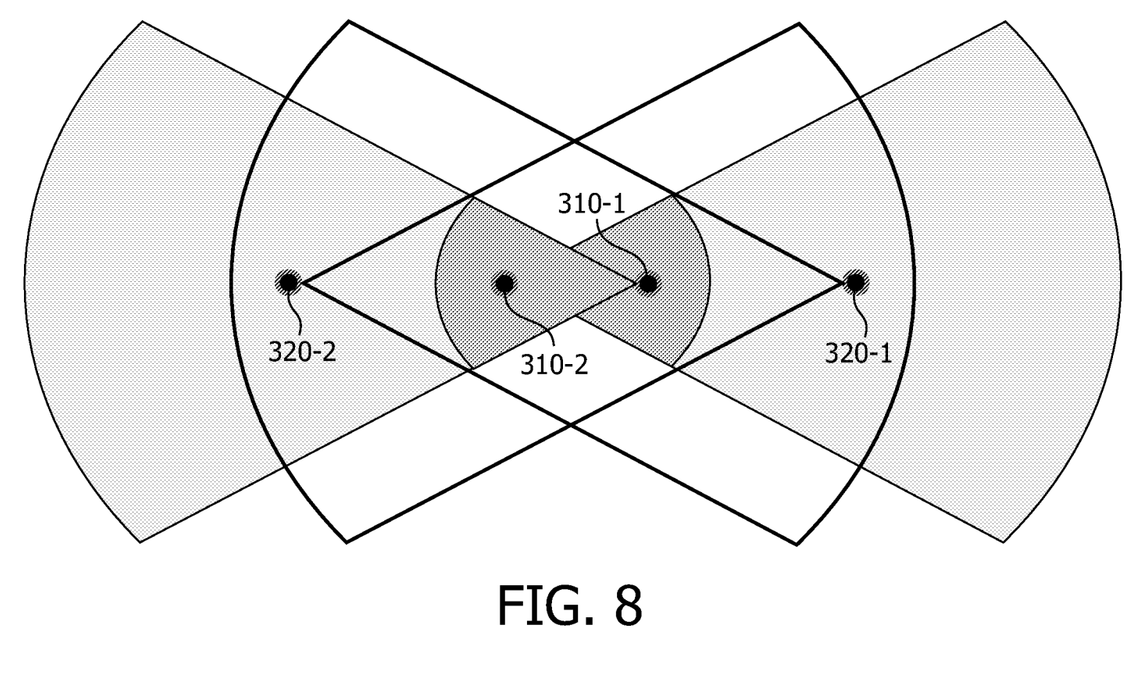
FIG. 8 shows one exemplary arrangement for illustrating a method of synchronizing wireless devices in a dual-beacon wireless network.

FIG. 8 shows one exemplary arrangement for illustrating a method of synchronizing wireless devices in a dual-beacon wireless network as outlined above.

FIG. 8 shows first and second simple wireless devices 310-1 and 310-2 and first and second advanced wireless devices 320-1 and 320-2.

First and second simple wireless devices 310-1 and 310-2 synchronize with each other via SD beacons 315 only. First advanced wireless device 320-1 receives AD beacons 325 from second simple wireless device 310-2 and advanced wireless device 320-2, synchronizes with second simple wireless device 310-2, and marks itself (e.g., in its beacon 325) as a forced-synchronization device. Second advanced wireless device 320-2 receives AD beacons 325 from first simple wireless device 310-1 and first advanced wireless device 320-1, synchronizes with first simple wireless device 310-1, and marks itself (e.g., in its beacon 325) as a forced-synchronization device. As a result, the clocks 216 of first and second simple wireless devices 310-1 and 310-2 and first and second advanced wireless devices 320-1 and 320-2 will not drift apart.

Figure 9:
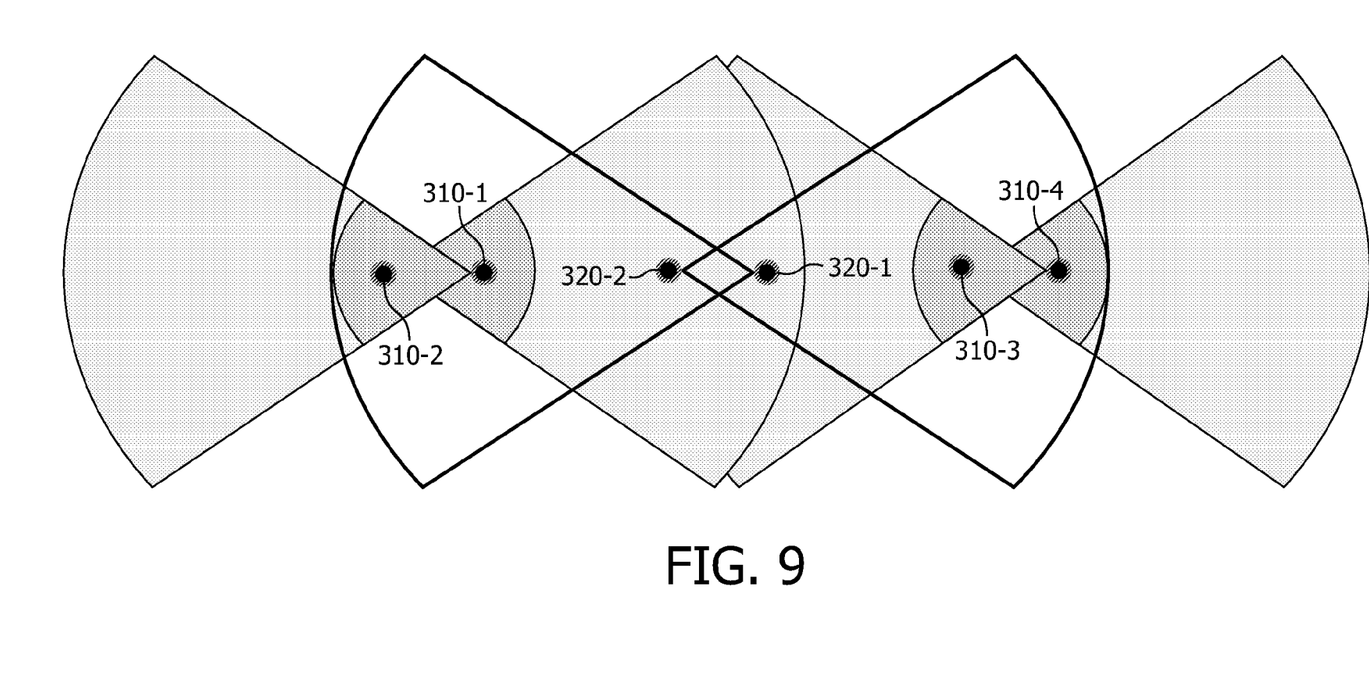
FIG. 9 shows another exemplary arrangement for illustrating a method of synchronizing wireless devices in a dual-beacon wireless network.

FIG. 9 shows another exemplary arrangement for illustrating a method of synchronizing wireless devices in a dual-beacon wireless network.

FIG. 9 shows first, second, third and fourth simple wireless devices 310-1 through 310-4, and first and second advanced wireless devices 320-1 and 320-2.

First and second simple wireless devices 310-1 and 310-2 synchronize with each other, and third and fourth simple wireless devices 310-3 and 310-4 synchronize with each other, respectively, via SD beacons 315 only.

First advanced wireless device 320-1 receives AD beacons 325 from second simple wireless device 310-2 and second advanced wireless device 320-2, synchronizes with second simple wireless device 310-2, and marks itself (e.g., in its beacon 325) as a forced-synchronization device.

Second advanced wireless device 320-2 receives AD beacons 325 from fourth simple wireless device 310-4 and first advanced wireless device 320-1, synchronizes with fourth simple wireless device 310-4, and marks itself (e.g., in its beacon 325) as a forced-synchronization device.

In this case, first and second advanced wireless devices 320-1 and 320-2 are able to receive each other's beacons and from this they are able to determine that both first and second advanced wireless devices 320-1 and 320-2 are forced-synchronization devices, but that they are not synchronized to each other. Therefore, first and second advanced wireless devices 320-1 and 320-2 both switch channels and communicate on a different channel than first, second, third and fourth simple wireless devices 310-1 through 310-4 and thus not interfere with them. Then, on the new channel, first and second advanced wireless devices 320-1 and 320-2 are able to synchronize with each other as in the case above where a system includes only advanced wireless devices 320.

In a general, assume a system that can include Type-A wireless devices and Type-B wireless devices. Type-A wireless devices are adapted to transmit and receive only first beacons having a first format. Type-B wireless devices are adapted to transmit and receive second beacons having a second format different from the first format, and can also transmit the first beacons. In that case, a method of beacon synchronization operates as follows.

When a first Type-A wireless device receives at least one second beacon from at least one Type-B wireless device, then the first Type-A wireless device synchronizes to the Type-B wireless device having the slowest clock and transmits second beacons that indicate that the first Type-A wireless device is operating as a forced synchronization device.

When the first Type-A wireless device does not receive any first beacons from any Type-B wireless devices, but receives a first beacon from a second Type-A wireless device which second beacon indicates that the second Type-A wireless device is operating as a forced synchronization device, then the first Type-A wireless devices synchronizes to the second Type-A wireless device and transmits second beacons that indicate that the first Type-A wireless device is operating as a forced synchronization device.

When the first Type-A wireless device does not receive any first beacons from any Type-B wireless devices, but does receive a first beacon from a second Type-A wireless device which first beacon indicates that the second Type-A wireless device is not operating as a forced synchronization device, then whichever of the first and second Type-A wireless devices that has the faster clock synchronizes to the other Type-A wireless device having the slower clock and transmits first beacons that indicate that the first Type-A wireless device is not operating as a forced synchronization device.

When the first Type-A wireless device is operating as a forced synchronization device synchronized to a first Type-A wireless device, and the first Type-A wireless device receives a first beacon from a second Type-A wireless device which first beacon indicates that the second Type-A wireless device is operating as a forced synchronization device that is synchronized to a second Type-B wireless device, and the second Type-A wireless device is considered as an alien device, then one of the Type-A wireless devices switches a channel on which it is operating.

Figure 10:
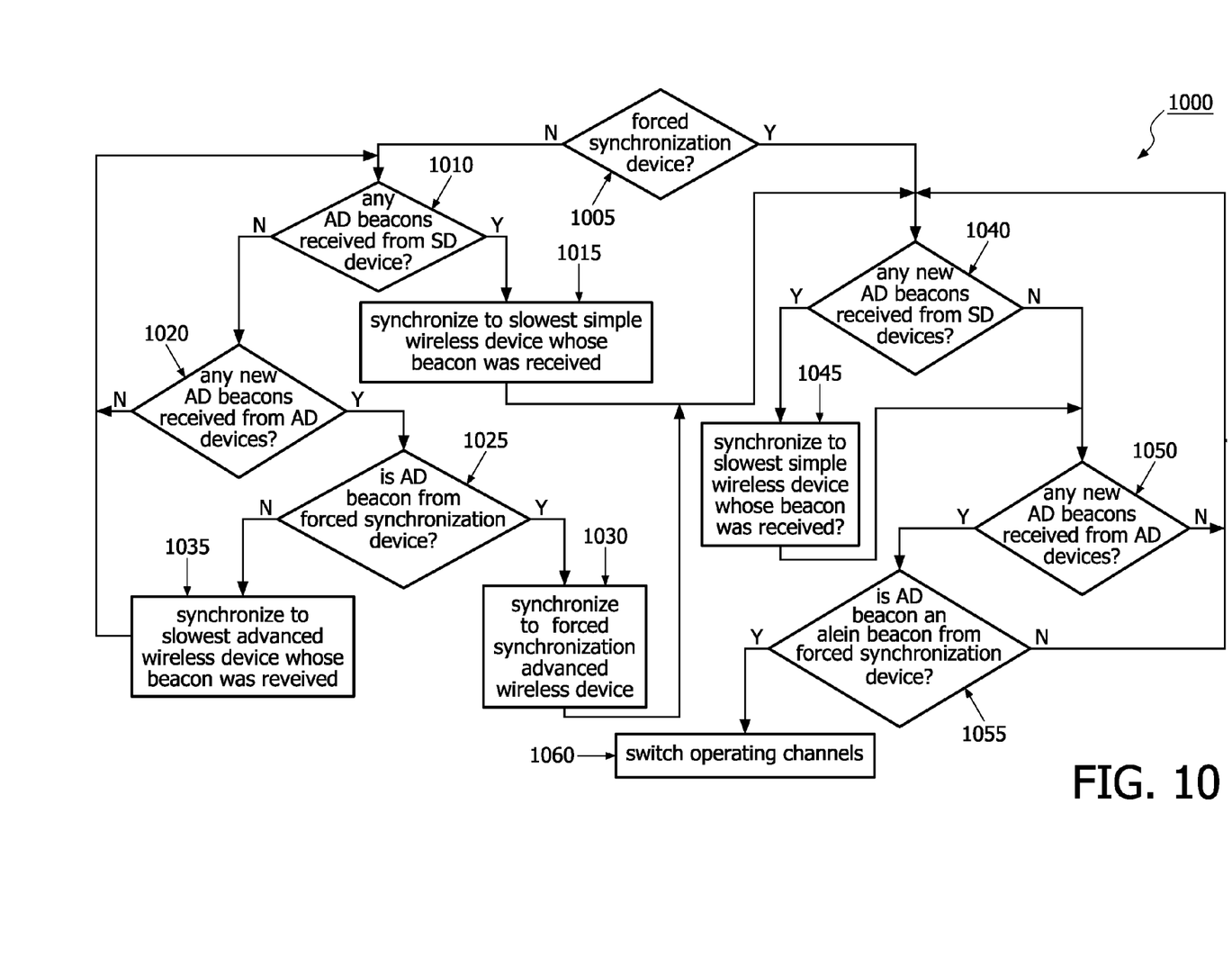
FIG. 10 is a flowchart illustrating one example embodiment of a method of synchronizing wireless devices in a dual-beacon wireless network.

FIG. 10 is a flowchart illustrating one example embodiment of a method 1000 of synchronizing a wireless device in a dual-beacon wireless network. In the example of FIG. 10, the wireless device is an advanced wireless device 320.

In a first step 1005, it is determined whether the advanced wireless device 320 is marked as a forced synchronization device. If not, then the method proceeds to step 1010, otherwise the method proceeds to a step 1040 as described below.

In a step 1010, the advanced wireless device 320 determines whether it receives any new AD beacons 325 from any simple wireless devices 310. If so, then the method proceeds to step 1015. Otherwise, the method proceeds to a step 1020 as described below.

In a step 1015, the advanced wireless device 320 synchronizes itself to the slowest simple wireless device 310 whose beacon has been received. Then, the advanced wireless device 320 marks itself as a forced synchronization device. Then the process proceeds to step 1040.

In a step 1020, the advanced wireless device 320 determines whether it receives any AD beacons 325 from another advanced wireless device 320. If so, then the method proceeds to step 1025. If not, the process returns to step 1010.

In a step 1025, the advanced wireless device 320 determines whether the AD beacon 325 indicates that the other advanced wireless device is a forced synchronization device. If so, then the process proceeds to step 1030. If not, the process proceeds to step 1035.

In step 1030, the advanced wireless device 320 synchronizes itself to the other wireless device 320 that is marked as a forced synchronization device, and marks itself as a forced synchronization device. Then the process continues at step 1040.

In step 1035, the advanced wireless device 320 synchronizes itself to the slowest advanced wireless device 320 without marking itself as a forced synchronization device, and returns to step 1010.

In step 1040, the advanced wireless device 320 determines whether it receives any new AD beacons 325 from any simple wireless devices 310. If so, then the method proceeds to step 1045. Otherwise, the method proceeds to a step 1050 as described below.

In a step 1045, the advanced wireless device 320 synchronizes itself to the slowest simple wireless device 310 whose beacon has been received. Then the process proceeds to step 1050.

In a step 1050, the advanced wireless device 320 determines whether it receives any AD beacons 325 from another advanced wireless device 320. If so, then the method proceeds to step 1055. If not, the process returns to step 1040.

In a step 1055, the advanced wireless device 320 determines whether the AD beacon 325 indicates that the other advanced wireless device 320 is a forced synchronization device from a "foreign" wireless network, whereby the other advanced wireless device 320 is forced-synchronized to a different simple wireless device 310. If so, then the process proceeds to step 1060. If not, then the process returns to step 1040.

In a step 1060, the advanced wireless device 320 determines that it is not synchronized with the other advanced wireless device 320 which is forced-synchronized to a different simple wireless device 310. In that case, at least one of the advanced wireless devices 320 switches operating channels.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A method of beacon synchronization in a system adapted to include at least two different types of wireless devices including Type-A wireless devices and Type-B wireless devices, wherein Type-B wireless devices are adapted to transmit Type-A beacons having a first format and Type-B beacons having a second format different from the first format and to receive only the Type-B beacons having the second format, and wherein Type-A wireless devices are adapted to transmit and receive only the Type-A beacons having the first format, the method comprising:

when the first Type-A wireless device receives at least one Type-A beacon from one or more Type-B wireless devices, then synchronizing the first Type-A wireless device to one of the one or more Type-B wireless devices having a slowest clock, and transmitting Type-A beacons from the first Type-A wireless device that indicate that the first Type-A wireless device is operating as a forced synchronization device;

when the first Type-A wireless device does not receive any Type-A beacons from any Type-B wireless devices, and receives a Type-A beacon from a second Type-A wireless device which Type-A beacon indicates that the second Type-A wireless device is not operating as a forced synchronization device, then synchronizing whichever of the first and second Type-A wireless devices that has a faster clock to whichever of the first and second Type-A wireless devices that has a slower clock, and transmitting Type-A beacons from the first Type-A wireless device that indicate that the first Type-A wireless device is not operating as a forced synchronization device;

when the first Type-A wireless device does not receive any Type-A beacons from any Type-B wireless devices, and receives a Type-A beacon from a second Type-A wireless device which Type-A beacon indicates that the second Type-A wireless device is operating as a forced synchronization device, then synchronizing the first Type-A wireless device to the second Type-A wireless device and transmitting Type-A beacons from the first Type-A wireless device that indicate that the first Type-A wireless device is operating as a forced synchronization device; and when the first Type-A wireless device is operating as a forced synchronization device synchronized to a first Type-B wireless device, and the first Type-A wireless device receives a Type-A beacon from a second Type-A wireless device which Type-A beacon indicates that the second Type-A wireless device is operating as a forced synchronization device that is synchronized to a second Type-B wireless device in a foreign network, then switching a channel on which at least one of the first Type-A wireless device and the second Type-A wireless device is operating.

2. The method of claim 1, wherein the Type-A wireless devices are adapted to transmit and receive the Type-A beacons having the first format over a greater distance than the Type-B wireless devices are adapted to transmit and receive the Type-B beacons having the second format.

3. The method of claim 2, wherein the Type-A beacons are encoded with a more robust error correction code than an error correction code employed for the Type-B beacons.

4. The method of claim 1, wherein the Type-A and Type-B beacons are all transmitted within a same beacon period of a superframe.

5. The method of claim 4, wherein the Type-A wireless devices employ a directional antenna pattern.

6. A method of synchronizing a first wireless device in a wireless network, the method comprising:

receiving at least one beacon of a first type;

synchronizing the first wireless device based on a timing of the at least one beacon of the first type; and whenever the first wireless device synchronizes itself to a timing of a second wireless device that is responsive only to a beacon of a second type and not responsive to the beacon of the first type even when the second wireless device is within a broadcast coverage area of the beacon of the first type, wherein the beacon of the second type employs a format that is different from a format for the beacon of the first type, marking the first wireless device as a forced synchronization device and transmitting beacons of the first type from the first wireless device that indicate that the first wireless device is operating as a forced synchronization device.

7. The method of claim 6, wherein the first wireless device synchronizing itself to a timing of a second wireless device that is unable to receive beacons of the first type includes the first wireless device synchronizing itself to a timing of a third wireless device that is able to receive beacons of the first type and whose timing is in turn synchronized to the second wireless device.

8. The method of claim 6, further comprising whenever the first wireless device is marked as a forced synchronization device, and the first wireless device receives at least one beacon of the first type from a third, alien wireless device that is also able to receive beacons of the first type and whose timing is synchronized to a fourth wireless device that is unable to receive beacons of the first type, then one of the first and third wireless devices switches to a new channel.

9. The method of claim 6, wherein receiving at least one beacon of the first type comprises receiving a plurality of beacons of the first type from a plurality of wireless devices that are unable to receive beacons of the first type, and wherein synchronizing the first wireless device based on a timing of the at least one beacon of the first type comprises synchronizing the first wireless device to a one of the plurality of wireless devices that are unable to receive beacons of the first type which has a slowest clock.

10. A wireless device adapted to operate in a wireless network, the wireless device comprising:

a transmitter;
a receiver; and
a clock, wherein the receiver is adapted to receive at least one beacon of a first type and the clock is adapted to be synchronized based on timing of the at least one beacon of the first type, and wherein whenever the clock is synchronized to a second wireless device that is responsive only to a beacon of a second type and not responsive to the beacon of the first type even when the second wireless device is within a broadcast coverage area of the beacon of the first type, wherein the beacon of the second type employs a format that is different from a format for the beacon of the first type, the wireless device marks itself as a forced synchronization device, and the transmitter transmits beacons of the first type that indicate that the wireless device is operating as a forced synchronization device.

11. The wireless device of claim 10, wherein the wireless device synchronizes itself to the second wireless device that is unable to receive beacons of the first type by synchronizing the wireless device to a third wireless device that is able to receive beacons of the first type and whose timing is in turn synchronized to the second wireless device.

12. The wireless device of claim 10, wherein whenever the wireless device is marked as a forced synchronization device, and the wireless device receives at least one beacon of the first type from a third, alien wireless device that is also able to receive beacons of the first type and whose timing is synchronized to a fourth wireless device that is unable to receive beacons of the first type, then one of the wireless device and the third wireless device switches its transmitter and receiver to a new channel.

13. The wireless device of claim 10, wherein the receiver receives a plurality of beacons of the first type from a plurality of other wireless devices that are unable to receive beacons of the first type, and wherein the clock is adapted to be synchronized to a one of the plurality of other wireless devices that are unable to receive beacons of the first type which has a slowest clock.

* * * * *